(12) United States Patent
Kageyama

(10) Patent No.: US 11,760,831 B2
(45) Date of Patent: Sep. 19, 2023

(54) POLYMERIZABLE COMPOSITION FOR OPTICAL MEMBER

(71) Applicant: HOYA LENS THAILAND LTD., Pathumthani (TH)

(72) Inventor: Yukio Kageyama, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 101 days.

(21) Appl. No.: 17/254,438

(22) PCT Filed: Jun. 26, 2019

(86) PCT No.: PCT/JP2019/025278
§ 371 (c)(1),
(2) Date: Dec. 21, 2020

(87) PCT Pub. No.: WO2020/004432
PCT Pub. Date: Jan. 2, 2020

(65) Prior Publication Data
US 2021/0277171 A1     Sep. 9, 2021

(30) Foreign Application Priority Data
Jun. 28, 2018   (JP) ................. 2018-123228

(51) Int. Cl.
| | |
|---|---|
| *C08G 18/75* | (2006.01) |
| *C08G 18/24* | (2006.01) |
| *C08G 18/28* | (2006.01) |
| *C08G 18/38* | (2006.01) |
| *C08G 18/76* | (2006.01) |
| *G02B 1/04* | (2006.01) |
| *C08F 222/10* | (2006.01) |
| *G02C 7/02* | (2006.01) |
| *C08L 81/02* | (2006.01) |
| *C08G 75/06* | (2006.01) |
| *C08G 18/08* | (2006.01) |
| *C08K 5/21* | (2006.01) |
| *C08G 18/32* | (2006.01) |

(52) U.S. Cl.
CPC ...... *C08G 18/757* (2013.01); *C08F 222/1025* (2020.02); *C08G 18/08* (2013.01); *C08G 18/242* (2013.01); *C08G 18/2815* (2013.01); *C08G 18/2835* (2013.01); *C08G 18/324* (2013.01); *C08G 18/3234* (2013.01); *C08G 18/3855* (2013.01); *C08G 18/3874* (2013.01); *C08G 18/3876* (2013.01); *C08G 18/76* (2013.01); *C08G 18/7621* (2013.01); *C08G 18/7635* (2013.01); *C08G 18/7642* (2013.01); *C08G 75/06* (2013.01); *C08K 5/21* (2013.01); *C08L 81/02* (2013.01); *G02B 1/04* (2013.01); *G02B 1/041* (2013.01); *G02B 1/043* (2013.01); *G02C 7/02* (2013.01)

(58) Field of Classification Search
CPC .............. C08G 18/757; C08G 18/242; C08G 18/2835; C08G 18/3876; C08G 18/7635; C08G 18/2815; C08G 18/3234; C08G 18/324; C08G 18/3874; C08G 18/7621; C08G 18/7642; C08G 75/05; C08G 18/76; C08G 18/08; C08G 18/3855; C08G 75/06; G02B 1/041; G02B 1/043; G02B 1/04; C08F 222/1025; C08K 5/21; C08L 81/02; G02C 7/02
See application file for complete search history.

(56) References Cited

U.S. PATENT DOCUMENTS

| | | | |
|---|---|---|---|
| 6,420,466 | B1 | 7/2002 | Haubennestel et al. |
| 9,796,860 | B2 | 10/2017 | Leutfeld et al. |
| 2002/0115882 | A1 | 8/2002 | Haubennestel et al. |
| 2004/0138401 | A1 | 7/2004 | Bojkova et al. |
| 2005/0282991 | A1 | 12/2005 | Bojkova et al. |
| 2006/0241273 | A1 | 10/2006 | Bojkova et al. |
| 2007/0142604 | A1 | 6/2007 | Bojkova et al. |
| 2009/0176945 | A1 | 7/2009 | Bojkova et al. |
| 2010/0010192 | A1 | 1/2010 | Kawaguchi et al. |
| 2010/0048852 | A1 | 2/2010 | Bojkova et al. |
| 2021/0024683 | A1 | 1/2021 | Asirvatham et al. |

FOREIGN PATENT DOCUMENTS

| | | |
|---|---|---|
| CN | 101460535 A | 6/2009 |
| CN | 105164175 A | 12/2015 |
| JP | 2002-105042 A | 4/2002 |
| JP | 2005-081772 A | 3/2005 |
| JP | 2006-509901 A | 3/2006 |
| JP | 2006-205710 A | 8/2006 |

(Continued)

OTHER PUBLICATIONS

Sep. 17, 2019 International Search Report issued in International Patent Application No. PCT/JP2019/025278.

*Primary Examiner* — Rabon A Sergent

(74) *Attorney, Agent, or Firm* — Oliff PLC

(57) ABSTRACT

The present invention relates to [1] a polymerizable composition for optical member containing a polymerizable component and a urethaneurea compound having a structural unit derived from tolylene diisocyanate in an amount of 0.1 to 10 parts by mass based on 100 parts by mass of a total amount of the polymerizable component; [2] a production method of an optical member, including a step of injecting the polymerizable composition of [1] into a molding die, and a step of polymerizing the polymerizable composition; and [3] a spectacle lens including a spectacle lens substrate obtained by the production method of [2].

17 Claims, No Drawings

(56) References Cited

FOREIGN PATENT DOCUMENTS

| | | |
|---|---|---|
| JP | 2007-164166 A | 6/2007 |
| JP | 2008-056854 A | 3/2008 |
| JP | 2008-540817 A | 11/2008 |
| JP | 2009-520057 A | 5/2009 |
| JP | 2009-524725 A | 7/2009 |
| JP | 2009-226742 A | 10/2009 |
| JP | 2014-040578 A | 3/2014 |
| JP | 2016-044286 A | 4/2016 |
| JP | 2017-110140 A | 6/2017 |
| JP | 2021-519365 A | 8/2021 |
| KR | 10-2014-0029250 A | 3/2014 |
| WO | 2007/078549 A2 | 7/2007 |
| WO | 2008/047626 A1 | 4/2008 |
| WO | 2013/146481 A1 | 10/2013 |
| WO | 2014/152819 A1 | 9/2014 |
| WO | 2014/153046 A2 | 9/2014 |
| WO | 2014/153054 A1 | 9/2014 |

POLYMERIZABLE COMPOSITION FOR OPTICAL MEMBER

TECHNICAL FIELD

The present invention relates to a polymerizable composition which is used for an optical member, such as a spectacle lens, a production method of an optical member using the same, and a spectacle lens, and so on.

BACKGROUND ART

A resin-made lens is lighter than a lens formed of an inorganic material, such as inorganic glass, is hard to crack, and can be dyed advantageously. Therefore, it is currently the mainstream to use a resin-made lens as an optical member, such as a spectacle lens and a camera lens.

As a material for a resin-made lens, a polyurethane-based resin, such as thiourethane, is used (see, for example, PTL 1), and a plastic lens using the polyurethane-based resin is, for example, produced by injecting a mixed liquid containing a polymerizable component into a molding die to obtain a molded body (see, for example, PTL 2).

Then, PTL 3 discloses a production method of a plastic lens that has practical productivity and can provide a thick plastic lens free from optical distortion, striae, or the like, the method including a filling step of filling a polymerizable composition into a molding mold; and a curing step of curing the polymerizable composition by exposing the molding mold under a predetermined temperature condition, wherein the curing step includes a holding step of holding the polymerizable composition after the filling step at an initial temperature during the filling step or higher; and a cooling step of cooling the polymerizable composition after the holding step.

CITATION LIST

Patent Literature

PTL 1: JP 2008-56854 A
PTL 2: JP 2006-205710 A
PTL 3: JP 2009-226742 A

SUMMARY OF INVENTION

Technical Problem

In order to obtain a thick optical member free from optical distortion, striae, or the like as disclosed in PTL 3, it is of a problem of setting a temperature condition in the polymerization. For example, if the polymerization time is shortened, in order to suppress the occurrence of striae, it is possible to optimize the amount of a catalyst and the polymerization temperature condition to cope with it, but a lot of man-hours are required for setting the polymerization condition. Thus, in some cases, striae occurred frequently.

Then, an embodiment of the present disclosure relates to a polymerizable composition for optical member in which the occurrence of striae is suppressed, a production method of an optical member using the same, and a spectacle lens, and so on.

Solution to Problem

The present inventor has found that the aforementioned problem can be solved by containing a urethaneurea compound having a structural unit derived from tolylene diisocyanate in a polymerizable composition for optical member containing a polymerizable component.

Specifically, an embodiment of the present disclosure relates to the following [1] to [3].

[1] A polymerizable composition for optical member containing a polymerizable component and a urethaneurea compound having a structural unit derived from tolylene diisocyanate in an amount of 0.1 to 10 parts by mass based on 100 parts by mass of a total amount of the polymerizable component.

[2] A production method of an optical member, including
a step of injecting the polymerizable component of [1] into a molding die, and
a step of polymerizing the polymerizable component.

[3] A spectacle lens including a spectacle lens substrate obtained by the production method of [2].

Advantageous Effects of Invention

In accordance with an embodiment of the present disclosure, it is possible to provide a polymerizable composition for optical member in which the occurrence of striae is suppressed, a production method of an optical member using the same, and a spectacle lens, and so on.

DESCRIPTION OF EMBODIMENTS

[Polymerizable Composition]

The polymerizable composition according to an embodiment of the present disclosure contains a polymerizable component and a urethaneurea compound having a structural unit derived from tolylene diisocyanate in an amount of 0.1 to 10 parts by mass based on 100 parts by mass of a total amount of the polymerizable component.

When the foregoing constitution is provided, a polymerizable composition for optical member in which the occurrence of striae is suppressed, a production method of an optical member using the same, and a spectacle lens, and so on are obtained.

<Urethaneurea Compound>

The urethaneurea compound means a compound having a urethane bond and a urea bond.

From the viewpoint of suppressing the occurrence of striae, the urethaneurea compound has a structural unit derived from tolylene diisocyanate; preferably has a structural unit derived from tolylene diisocyanate and further has a hydrocarbon group at a terminal; and more preferably has a structural unit derived from tolylene diisocyanate and a structural unit derived from 1,3-bis(isocyanatomethyl)benzene, and further has a hydrocarbon group at a terminal.

In the urethaneurea compound, the "structural unit derived from" an isocyanate means a unit in which an isocyanate reacts with an alcohol or an amine to form a urethane bond or a urea bond.

A molecular weight of the urethaneurea compound is preferably 300 or more, more preferably 400 or more, and still more preferably 500 or more, and it is preferably 1,500 or less, more preferably 1,200 or less, and still more preferably 1,000 or less.

From the viewpoint of more suppressing the occurrence of striae, the urethaneurea compound is a compound represented by the formula (1).

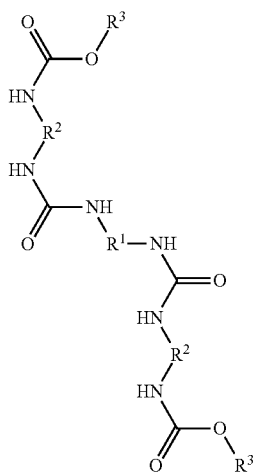

(1)

In the formula (1), $R^1$ is a group represented by any one of the formulae (R1-1), (R1-2), (R1-3), (R1-4), and (R1-5).

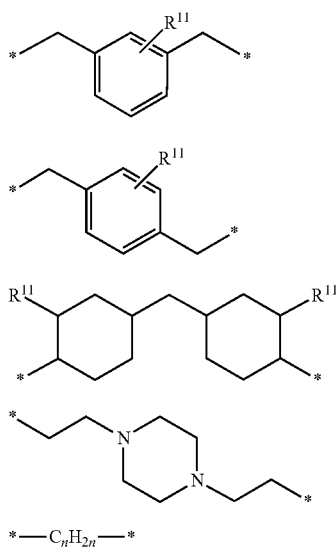

In the formulae, $R^{11}$'s are each independently a hydrogen atom or a hydrocarbon group having 1 to 3 carbon atoms; n is an integer of 1 to 6; and * is a bonding site.

Examples of the hydrocarbon group having 1 to 3 carbon atoms include a methyl group, an ethyl group, a n-propyl group, and an isopropyl group. $R^{11}$ is preferably a hydrogen atom.

From the viewpoint of more suppressing the occurrence of striae, $R^1$ is preferably a group represented by any one of the formulae (R1-1), (R1-2), and (R1-3), more preferably a group represented by the formula (R1-1) or (R1-2), and still more preferably a group represented by the formula (R1-1).

In the formula (1), $R^2$'s are each independently a group represented by the formula (R2-1) or (R2-2).

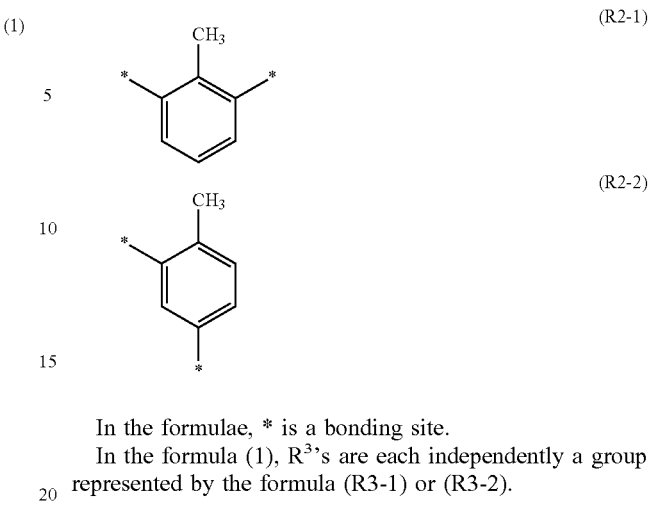

In the formulae, * is a bonding site.
In the formula (1), $R^3$'s are each independently a group represented by the formula (R3-1) or (R3-2).

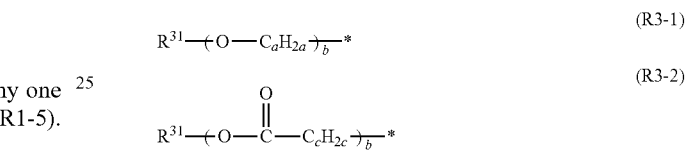

In the formulae, $R^{31}$ is a linear or branched aliphatic hydrocarbon group having 2 to 22 carbon atoms, a cyclic aliphatic hydrocarbon group having 6 to 12 carbon atoms, or an aralkyl group having 7 to 12 carbon atoms; a is 2 to 4; b is 0 to 15; and c is 4 or 5.

The aliphatic hydrocarbon group is preferably a linear aliphatic hydrocarbon group.

From the viewpoint of more suppressing the occurrence of striae, the number of carbon atoms of the aliphatic hydrocarbon group is preferably 3 or more, and more preferably 4 or more, and it is preferably 18 or less, more preferably 12 or less, and still more preferably 8 or less.

Examples of the aliphatic hydrocarbon group include a n-butyl group, a tert-butyl group, a n-hexyl group, a n-octyl group, a n-decyl group, a n-dodecyl group, a n-hexadecyl group, a n-octadecyl group, and an eicosyl group. Of these, a n-butyl group and a n-dodecyl group are preferred, and a n-butyl group is more preferred.

The number of carbon atoms of the cyclic aliphatic hydrocarbon group is preferably 6 or more, and it is preferably 10 or less, and more preferably 8 or less.

Examples of the cyclic aliphatic hydrocarbon group include a cyclohexyl group, a methylcyclohexyl group, and an ethylcyclohexyl group. Of these, a cyclohexyl group is preferred.

The number of carbon atoms of the aralkyl group is preferably 7 or more, and it is preferably 10 or less, and more preferably 8 or less. Examples of the aralkyl group include a benzyl group.

a is preferably 2 to 3, and more preferably 2.
b is preferably 0 to 10, more preferably 0 to 6, still more preferably 0 to 3, and yet still more preferably 0.
c is preferably 4.
$R^{31}$ is preferably a linear aliphatic hydrocarbon group having 4 to 8 carbon atoms or a cyclic aliphatic hydrocarbon group having 6 to 8 carbon atoms, more preferably a n-butyl group or a cyclohexyl group, and still more preferably a n-butyl group.

Examples of the urethaneurea compound include the following Compound A-1 to Compound A-4.
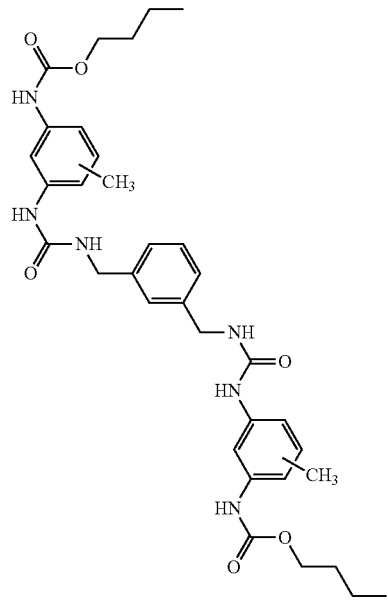
A-1
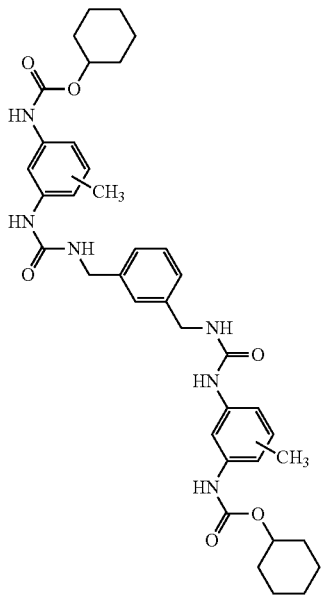
A-3
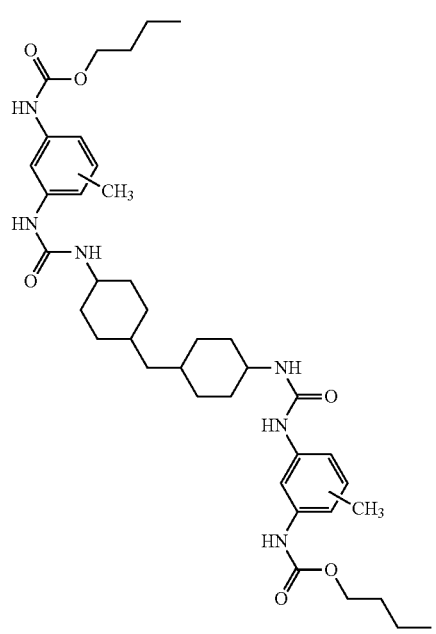
A-2
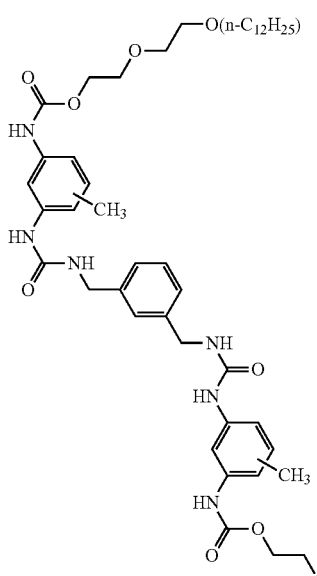
A-4
However, in Compounds A-1 to A-4, the site:
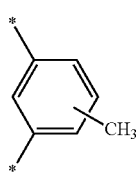

is preferably

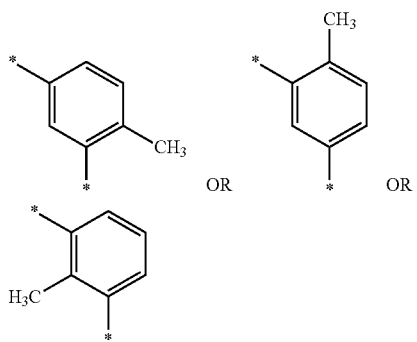

wherein * is a bonding site.

Of these, from the viewpoint of more suppressing striae, Compound A-1, Compound A-2, and Compound A-3 are preferred, Compound A-1 and Compound A-2 are still more preferred, and Compound A-1 is still more preferred.

Although the urethaneurea compound can be produced by a known method, for example, it is obtained by a production method disclosed in JP 2002-105042 A.

From the viewpoint of more suppressing striae, the content of the urethaneurea compound is preferably 0.1 to 10 parts by mass, and more preferably 0.2 to 8.0 parts by mass based on 100 parts by mass of a total amount of the aforementioned polymerizable component.

From the viewpoint of suppressing striae and further suppressing white turbidity, the content of the urethaneurea compound is preferably 0.1 to 5.0 parts by mass, and more preferably 0.5 to 5.0 parts by mass based on 100 parts by mass of a total amount of the aforementioned polymerizable component.

From the viewpoint of more suppressing striae, the content of the urethaneurea compound is preferably 0.1 parts by mass or more, more preferably 0.2 parts by mass or more, and still more preferably 0.5 parts by mass or more based on 100 parts by mass of a total amount of the aforementioned polymerizable component; and from the viewpoint of more suppressing striae, it is preferably 10 parts by mass or less, and more preferably 8.0 parts by mass or less, and from the viewpoint of suppressing striae and further suppressing white turbidity, it is still more preferably 5.0 parts by mass or less, and most preferably 4.0 parts by mass or less.

<Polymerizable Component>

The polymerizable component preferably contains at least one selected from the group consisting of a polyisocyanate component and a polythiol component, an epithio compound, and an acrylic compound.

When a polyisocyanate component and a polythiol component are contained as the polymerizable component, a polythiourethane resin is obtained.

When an epithio compound is contained as the polymerizable component, an epithio resin is obtained.

When an acrylic compound is contained as the polymerizable component, an acrylic resin is obtained.

Each of these is hereunder described in order.

(Polyisocyanate Component and Polythiol Component)

Examples of the polyisocyanate component include a polyisocyanate compound having an aromatic ring, an alicyclic polyisocyanate compound, and a linear or branched aliphatic polyisocyanate compound.

Examples of the polyisocyanate compound having an aromatic ring include diisocyanatobenzene, 2,4-diisocyanatotoluene, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, biphenyl diisocyanate, toluidine diisocyanate, 4,4'-methylene bis(phenyl isocyanate), 4,4'-methylene bis(2-methylphenyl isocyanate), bibenzyl-4,4'-diisocyanate, bis(isocyanatophenyl)ethylene, 1,3-bis(isocyanatomethyl)benzene, 1,4-bis(isocyanatomethyl)benzene, 1,3-bis(isocyanatoethyl)benzene, bis(isocyanatopropyl)benzene, α,α,α',α'-tetramethylxylylene diisocyanate, bis(isocyanatobutyl)benzene, bis(isocyanatomethyl)naphthalene, bis(isocyanatomethylphenyl) ether, 2-isocyanatophenyl-4-isocyanatophenylsulfide, bis(4-isocyanatophenyl)sulfide, bis(4-isocyanatomethylphenyl)sulfide, bis(4-isocyanatophenyl)disulfide, bis(2-methyl-5 isocyanatophenyl)disulfide, bis(3-methyl-5-isocyanatophenyl)disulfide, bis(3-methyl-6-isocyanatophenyl)disulfide, bis(4-methyl-5-isocyanatophenyl)disulfide, bis(3-methyloxy-4-isocyanatophenyl)disulfide, and bis(4-methyloxy-3-isocyanatophenyl)disulfide.

Examples of the alicyclic polyisocyanate compound include 1,3-diisocyanatocyclohexane, isophorone diisocyanate, 1,3-bis(isocyanatomethyl)cyclohexane, 1,4-bis(isocyanatomethyl)cyclohexane, dicyclohexylmethane-4,4'-diisocyanate, 2,5-bis(isocyanatomethyl)-bicyclo[2.2.1]heptane, 2,6-bis(isocyanatomethyl)-bicyclo[2.2.1]heptane, 2,5-diisocyanato-1,4-dithiane, 2,5-bis(isocyanatomethyl)-1,4-dithiane, 4,5-diisocyanato-1,3-dithiolane, 4,5-bis(isocyanatomethyl)-1,3-dithiolane, and 4,5-bis(isocyanatomethyl)-2-methyl-1,3-dithiolane.

Examples of the linear or branched aliphatic polyisocyanate compound include hexamethylene diisocyanate, 2,2-dimethylpentane diisocyanate, 2,2,4-trimethylhexane diisocyanate, butene diisocyanate, 1,3-butadiene-1,4-diisocyanate, 2,4,4-trimethylhexamethylene diisocyanate, 1,6,11-undecane triisocyanate, 1,3,6-hexamethylene triisocyanate, 1,8-diisocyanato-4-isocyanatomethyloctane, bis(isocyanatoethyl) carbonate, bis(isocyanatoethyl) ether, lysine diisocyanatomethyl ester, lysine triisocyanate, bis(isocyanatomethyl)sulfide, bis(isocyanatoethyl)sulfide, bis(isocyanatopropyl)sulfide, bis(isocyanatohexyl)sulfide bis(isocyanatomethyl)sulfone, bis(isocyanatomethyl)disulfide, bis(isocyanatoethyl)disulfide, bis(isocyanatopropyl)disulfide, bis(isocyanatomethylthio)methane, bis(isocyanatoethylthio)methane, bis(isocyanatomethylthio)ethane, bis(isocyanatoethylthio)ethane, 1,5-diisocyanato-2-isocyanatomethyl-3-pentane, 1,2,3-tris(isocyanatomethylthio)propane, 1,2,3-tris(isocyanatoethylthio)propane, 3,5-dithia-1,2,6,7-heptane tetraisocyanate, 2,6-diisocyanatomethyl-3,5-dithia-1,7-heptane diisocyanate, 2,5-diisocyanatomethylthiophene, 4-isocyanatoethylthio-2,6-dithia-1,8-octane diisocyanate, 1,2-diisothiocyanatoethane, and 1,6-diisothiocyanatohexane.

One kind or two or more kinds of these compounds may be used.

The polyisocyanate component preferably contains at least one polyisocyanate compound selected from the group consisting of 2,5-bis(isocyanatomethyl)-bicyclo[2.2.1]heptane, 2,6-bis(isocyanatomethyl)-bicyclo[2.2.1]heptane, 1,3-bis(isocyanatomethyl)cyclohexane, 1,4-bis(isocyanatomethyl)cyclohexane, 1,3-bis(isocyanatomethyl)benzene, 1,4-bis(isocyanatomethyl)benzene, dicyclohexylmethane-4,4'-diisocyanate, isophorone diisocyanate, and hexamethylene diisocyanate, more preferably contains at least one polyisocyanate compound selected from the group consisting of 1,3-bis (isocyanatomethyl)benzene, hexamethylene diisocyanate, and 1,3-bis(isocyanatomethyl)cyclohexane, and still more preferably contains 1,3-bis(isocyanatomethyl)benzene.

The content of the aforementioned preferred polyisocyanate compound in the polyisocyanate component is preferably 50% by mass or more, more preferably 70% by mass or more, still more preferably 90% by mass or more, and yet still more preferably 95% by mass or more, and it is 100% by mass or less.

Examples of the polythiol component include an ester compound of a polyol compound and a mercapto group-containing carboxylic acid compound, a linear or branched aliphatic polythiol compound, a polythiol compound having an alicyclic structure, and an aromatic polythiol compound.

In the ester compound of a polyol compound and a mercapto group-containing carboxylic acid compound, examples of the polyol compound include a compound having two or more hydroxy groups in a molecule thereof.

Examples of the polyol compound include ethylene glycol, diethylene glycol, propanediol, propanetriol, butanediol, trimethylolpropane, bis(2-hydroxyethyl)disulfide, pentaerythritol, and dipentaerythritol.

Examples of the mercapto group-containing carboxylic acid compound include thioglycolic acid, mercaptopropionic acid, a thiolactic acid compound, and thiosalicylic acid.

Examples of the ester compound of a polyol compound and a mercapto group-containing carboxylic acid compound include ethylene glycol bis(2-mercaptoacetate), ethylene glycol bis(2-mercaptopropionate), diethylene glycol bis(2-mercaptoacetate), diethylene glycol bis(2-mercaptopropionate), 1,4-butanediol bis(2-mercaptoacetate), 1,4-butanediol bis(3-mercaptopropionate), trimethylolpropane tris(2-mercaptoacetate), trimethylolpropane tris(3-mercaptopropionate), pentaerythritol tetrakis(2-mercaptoacetate), pentaerythritol tetrakis(2-mercaptopropionate), pentaerythritol tetrakis(3-mercaptopropionate), dipentaerythritol hexakis(2-mercaptoacetate), and dipentaerythritol hexakis(3-mercaptopropionate).

Examples of the linear or branched aliphatic polythiol compound include 1,2-ethanedithiol, 1,1-propanedithiol, 1,2-propanedithiol, 1,3-propanedithiol, 2,2-propane dithiol, 1,6-hexanedithiol, 1,2,3-propanetrithiol, 2,2-dimethylpropane-1,3-dithiol, 3,4-dimethyloxybutane-1,2-dithiol, 2,3-dimercapto-1-propanol, 1,2-dimercaptopropyl methyl ether, 2,3-dimercaptopropyl methyl ether, 2-(2-mercaptoethylthio)propane-1,3-dithiol, 2,2-bis(mercaptomethyl)-1,3-propanedithiol, bis(mercaptomethylthio)methane, tris(mercaptomethylthio)methane, bis(2-mercaptoethylthio)methane, 1,2-bis(mercaptomethylthio)ethane, 1,2-bis(2-mercaptoethylthio)ethane 1,3-bis(mercaptomethylthio)propane, 1,3-bis(2-mercaptoethylthio)propane, 1,1,2,2-tetrakis(mercaptoethylthio)ethane, 1,1,3,3-tetrakis(mercaptoethylthio)propane, 3-mercaptomethyl-1,5-dimercapto-2,4-dithiapentane, tetrakis(mercaptoethylthio)propane, bis(2-mercaptoethyl) ether, bis(2-mercaptoethyl)sulfide, bis(2-mercaptoethyl)disulfide, bis(2-mercaptoethylthio)-3-mercaptopropane, 4-mercaptomethyl-1,8-dimercapto-3,6-dithiaoctane, 4,7-bis(mercaptomethyl)-3,6,9-trithiaundecane-1,11-dithiol, 4,8-bis(mercaptomethyl)-3,6,9-trithiaundecane-1,11-dithiol, and 5,7-bis(mercaptomethyl)-3,6,9-trithiaundecane-1,11-dithiol.

Examples of the polythiol compound having an alicyclic structure include 1,1-cyclohexanedithiol, 1,2-cyclohexanedithiol, methylcyclohexanedithiol, bis(mercaptomethyl)cyclohexane, 2-(2,2-bis(mercaptomethylthio)ethyl)-1,3-dithietane, 2,5-bis(mercaptomethyl)-1,4-dithiane, and 4,8-bis(mercaptomethyl)-1,3-dithiane.

Examples of the aromatic polythiol compound include 1,3-dimercaptobenzene, 1,4-dimercaptobenzene, 1,3-bis(mercaptomethyl)benzene, 1,4-bis(mercaptomethyl)benzene, 1,3-bis(mercaptoethyl)benzene, 1,4-bis(mercaptoethyl)benzene, 1,3,5-trimercaptobenzene, 1,3,5-tris(mercaptomethyl)benzene, 1,3,5-tris(mercaptoethyl)benzene, 4,4'-dimercaptobiphenyl, 4,4'-dimercaptobibenzyl, 2,5-toluenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracene dimethanethiol, 1,3-di(p-methyloxyphenyl)propane-2,2-dithiol, 1,3-diphenylpropane-2,2-dithiol, phenylmethane-1,1-dithiol, and 2,4-di(p-mercaptophenyl)pentane.

One kind or two or more kinds of these compounds may be used.

The Polythiol Component preferably contains at least one selected from the group consisting of 2,5-bis(mercaptomethyl)-1,4-dithiane, pentaerythritol tetrakis(2-mercaptoacetate), pentaerythritol tetrakis(3-mercaptopropionate), 4-mercaptomethyl-1,8-dimercapto-3,6-dithiaoctane, 4,7-bis(mercaptomethyl)-3,6,9-trithiaundecane-1,11-dithiol, 4,8-bis(mercaptomethyl)-3,6,9-trithiaundecane-1,11-dithiol, 5,7-bis(mercaptomethyl)-3,6,9-trithiaundecane-1,11-dithiol, trimethylolpropane tris(2-mercaptoacetate), trimethylolpropane tris(3-mercaptopropionate), butanediol bis(2-mercaptoacetate), butanediol bis(3-mercaptopropionate), dipentaerythritol hexakis(2-mercaptoacetate), and dipentaerythritol hexakis(3-mercaptopropionate), more preferably contains at least one selected from the group consisting of 4,7-bis(mercaptomethyl)-3,6,9-trithiaundecane-1,11-dithiol, 4,8-bis(mercaptomethyl)-3,6,9-trithiaundecane-1,11-dithiol, 5,7-bis(mercaptomethyl)-3,6,9-trithiaundecane-1,11-dithiol, 4-mercaptomethyl-1,8-dimercapto-3,6-dithiaoctane, pentaerythritol tetrakis(3-mercaptopropionate), 2,5-bis(mercaptomethyl)-1,4-dithiane, and pentaerythritol tetrakis(2-mercaptoacetate), still more preferably contains at least one selected from the group consisting of 4,7-bis(mercaptomethyl)-3,6,9-trithiaundecane-1,11-dithiol, 4,8-bis(mercaptomethyl)-3,6,9-trithiaundecane-1,11-dithiol, and 5,7-bis(mercaptomethyl)-3,6,9-trithiaundecane-1,11-dithiol, and yet still more preferably contains a mixture of 4,7-bis(mercaptomethyl)-3,6,9-trithiaundecane-1,11-dithiol, 4,8-bis(mercaptomethyl)-3,6,9-trithiaundecane-1,11-dithiol, and 5,7-bis(mercaptomethyl)-3,6,9-trithiaundecane-1,11-dithiol.

The amount of the aforementioned preferred polythiol component in the polythiol component is preferably 50% by mass or more, more preferably 70% by mass or more, still more preferably 90% by mass or more, and yet still more preferably 95% by mass or more, and it is 100% by mass or less.

An equivalent ratio of the mercapto group of the polythiol component to the isocyanate group of the polyisocyanate component [(mercapto group)/(isocyanate group)] is preferably 40/60 or more, more preferably 43/57 or more, and still more preferably 45/55 or more, and it is preferably 60/40 or less, more preferably 55/45 or less, and still more preferably 53/47 or less.

A total content of the polythiol component and the polyisocyanate component in the polymerizable component is preferably 80% by mass or more, more preferably 90% by mass or more, and still more preferably 95% by mass or more, and it is 100% by mass or less.

In the polymerizable component, examples of a suitable combination of the polyisocyanate component and the polythiol component include (i) 1,3-bis(isocyanatomethyl)cyclohexane, 2,5-bis(mercaptomethyl)-1,4-dithiane, and pentaerythritol tetrakis(2-mercaptoacetate), (ii) 1,3-bis(isocyanatomethyl)benzene and a mixture of 4,7-bis(mercaptomethyl)-3,6,9-trithiaundecane-1,11-dithiol, 4,8-bis(mercaptomethyl)-3,6,9-trithiaundecane-1,11-dithiol, and 5,7-bis(mercaptomethyl)-3,6,9-trithiaundecane-1,11-dithiol, and (iii) a mixture of 2,5-bis(isocyanatomethyl)-bicyclo[2.2.1]heptane and 2,6-bis(isocyanatomethyl)-bicyclo[2.2.1]heptane, 4-mercaptomethyl-1,8-dimercapto-3,6-dithiaoctane, and pentaerythritol tetrakis(2-mercaptacetate).

(Epithio Compound)

The epithio compound is a compound having an episulfide group (epithio group).

Examples of the epithio compound include an episulfide compound having a linear or branched aliphatic skeleton, an episulfide compound having an alicyclic skeleton, an episulfide compound having an aromatic skeleton, and an episulfide compound having a dithiane ring skeleton.

Examples of the episulfide compound having a linear or branched aliphatic skeleton include bis-(β-epithiopropyl)sulfide, 2-(2-β-epithiopropylthioethylthio)-1,3-bis(β-epithiopropylthio)propane, 1,2-bis[(2-β-epithiopropylthioethyl)thio]-3-(β-epithiopropylthio)propane, tetrakis(β-epithiopropylthiomethyl)methane, and 1,1,1-tris(β-epithiopropylthiomethyl)propane.

Examples of the episulfide compound having an alicyclic skeleton include 1,3-bis(β-epithiopropylthio)cyclohexane, 1,4-bis(β-epithiopropylthio)cyclohexane, 1,3-bis(β-epithiopropylthiomethyl)cyclohexane, 1,4-bis(β-epithiopropylthiomethyl)cyclohexane, bis[4-(β-epithiopropylthio)cyclohexyl]methane, 2,2-bis[4-(β-epithiopropylthio)cyclohexyl]propane, and bis[4-(β-epithiopropylthio)cyclohexyl]sulfide.

Examples of the episulfide compound having an aromatic skeleton include 1,3-bis(β-epithiopropylthio)benzene, 1,4-bis(β-epithiopropylthio)benzene, 1,3-bis(β-epithiopropylthiomethyl)benzene, 1,4-bis(β-epithiopropylthiomethyl)benzene, bis[4-(β-epithiopropylthio)phenyl]methane, 2,2-bis[4-(β-epithiopropylthio)phenyl]propane, bis[4-(β-epithiopropylthio)phenyl]sulfide, bis[4-(3-epithiopropylthio)phenyl]sulfine, and 4,4-bis(β-epithiopropylthio)biphenyl.

Examples of the episulfide compound having a dithiane ring skeleton include 2,5-bis(β-epithiopropylthiomethyl)-1,4-dithiane, 2,5-bis(β-epithiopropylthioethylthiomethyl)-1,4-dithiane, 2,5-bis(β-epithiopropylthioethyl)-1,4-dithiane, and 2,3,5-tri(β-epithiopropylthioethyl)-1,4-dithiane.

In addition to the epithio compound, other polymerizable component than the aforementioned polyisocyanate component and polythiol component and the like may be added.

Of these, an episulfide compound having a linear or branched aliphatic skeleton is preferred, and bis-(β-epithiopropyl)sulfide is more preferred.

The content of the epithio compound in the polymerizable component is preferably 50% by mass or more, more preferably 60% by mass or more, still more preferably 70% by mass or more, yet still more preferably 80% by mass or more, and even yet still more preferably 90% by mass or more, and it is preferably 98% by mass or less, and more preferably 96% by mass or less.

In the combination with the epithio compound, it is preferred that a polythiol compound is further contained.

Examples of the polythiol compound include the compounds as exemplified above.

When used in combination with the epithio compound, the content of the polythiol compound in the polymerizable component is preferably 2% by mass or more, and more preferably 4% by mass or more, and it is preferably 50% by mass or less, more preferably 40% by mass or less, still more preferably 30% by mass or less, yet still more preferably 20% by mass or less, and even yet still more preferably 10% by mass or less.

(Acrylic Compound)

The acrylic compound refers to an acrylate compound and a methacrylate compound, and these compounds are hereinafter expressed as a (meth)acrylate compound.

Examples of the acrylic compound include a polyfunctional (meth)acrylate compound having an aromatic ring, a polyalkylene glycol di(meth)acrylate, and a monofunctional (meth)acrylate.

Of these, a polyfunctional (meth)acrylate compound having an aromatic ring and a polyalkylene glycol di(meth)acrylate are preferably contained.

Examples of the polyfunctional (meth)acrylate compound having an aromatic ring include an alkylene oxide-modified bisphenol A having a (meth)acryloyl group at both terminals; and an alkylene oxide-modified and urethane-modified bisphenol A having a (meth)acryloyl group at both terminals.

Of these, an alkylene oxide-modified bisphenol A having a (meth)acryloyl group at both terminals is preferred.

The alkylene oxide-modified bisphenol A having a (meth)acryloyl group at both terminals is preferably a compound represented by the formula (2).

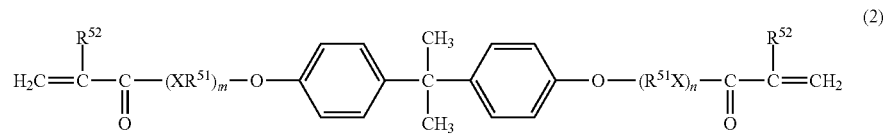

(2)

In the formula, $R^{51}$ is an ethylene group or a propyl group; $R^{52}$ is hydrogen or a methyl group; X is an oxygen atom or a sulfur atom, and preferably an oxygen atom; and m and n are each an average addition molar number, and (m+n) is 1.5 to 6, and preferably 2 to 4.

Examples of the alkylene oxide-modified bisphenol A having a (meth)acryloyl group at both terminals include 2,2-bis[4-[2-((meth)acryloyloxy)ethoxy]phenyl]propane and 2,2-bis[4-[2-((meth)acryloyloxy)ethoxy]-3,5-dibromophenyl]propane.

The content of the polyfunctional (meth)acrylate compound having an aromatic ring in the polymerizable component is preferably 40% by mass or more, more preferably 50% by mass or more, and still more preferably 55% by mass or more, and it is preferably 90% by mass or less, more preferably 80% by mass or less, and still more preferably 70% by mass or less.

Examples of the polyalkylene glycol di(meth)acrylate include diethylene glycol di(meth)acrylate, triethylene glycol di(meth)acrylate, tetraethylene glycol di(meth)acrylate, dipropylene glycol di(meth)acrylate, tripropylene glycol di(meth)acrylate, tetrapropylene glycol di(meth)arylate, dibutylene glycol di(meth)acrylate, tributylene glycol di(meth)acrylate, and tetrabutylene glycol di(meth)acrylate.

The content of the polyalkylene glycol di(meth)acrylate in the polymerizable component is preferably 10% by mass or more, more preferably 20% by mass or more, and still more preferably 30% by mass or more, and it is preferably 60% by mass or less, more preferably 50% by mass or less, and still more preferably 45% by mass or less.

Examples of the monofunctional (meth)acrylate include phenyl (meth)acrylate, benzyl (meth)acrylate, phenoxyethyl (meth)acrylate, 3-phenoxy-2-hydroxypropyl (meth)acrylate, 2-phenylphenyl (meth)acrylate, 4-phenylphenyl (meth)acrylate, 3-(2-phenylphenyl)-2-hydroxypropyl (meth)acrylate, 3-(4-phenylphenyl)-2-hydroxypropyl (meth)acrylate, 1-naphthyloxyethyl (meth)acrylate, 2-naphthyloxyethyl (meth)acrylate, 2,4,6-tribromophenyl (meth)acrylate, 2,4,6-tribromophenoxyethyl (meth)acrylate, 2,4,6-tribromophenyl-di(oxyethyl)-(meth)acrylate, and 2,4,6-tribromobenzyl (meth)acrylate.

A total content of the polymerizable component in the polymerizable composition is preferably 80% by mass or more, more preferably 85% by mass or more, and still more preferably 90% by mass or more, and it is preferably 99% by mass or less, and more preferably 95% by mass or less.

<Release Agent>

The polymerizable composition preferably contains a release agent.

Examples of the release agent include an acidic phosphate, such as an acidic alkyl phosphate. The number of carbon atoms of the alkyl group of the acidic alkyl phosphate is preferably 1 or more, and more preferably 4 or more, and it is preferably 20 or less, and more preferably 12 or less.

Although the acidic phosphate may be either a phosphoric monoester or a phosphoric diester, a mixture of a phosphoric monoester and a phosphoric diester is preferred.

Examples of the acidic alkyl phosphate include isopropyl acid phosphate, butyl acid phosphate, octyl acid phosphate, nonyl acid phosphate, decyl acid phosphate, isodecyl acid phosphate, tridecyl acid phosphate, stearyl acid phosphate, propylphenyl acid phosphate, butylphenyl acid phosphate, and butoxyethyl acid phosphate.

The addition amount of the release agent is preferably 0.01 parts by mass or more, more preferably 0.05 parts by mass or more, and still more preferably 0.10 parts by mass or more, and it is preferably 1.00 part by mass or less, more preferably 0.50 parts by mass or less, and still more preferably 0.30 parts by mass or less, based on 100 parts by mass of the total amount of the polymerizable component.

<Ultraviolet Absorber>

The polymerizable composition preferably contains an ultraviolet absorber.

Examples of the ultraviolet absorber include a benzotriazole-based compound, a benzophenone-based compound, dibenzoylmethane, and a dibenzoylmethane-based compound. Of these, a benzotriazole-based compound or a benzophenone-based compound is preferred.

Examples of the benzotriazole-based compound include 2-(2-hydroxy-5-methylphenyl)-2H-benzotriazole, 2-(2-hydroxy-3,5-di-tert-butylphenyl)-5-chloro-2H-benzotriazole, 2-(3-tert-butyl-2-hydroxy-5-methylphenyl)-5-chloro-2H-benzotriazole, 2-(2-hydroxy-3,5-di-tert-amylphenyl)-2H-benzotriazole, 2-(2-hydroxy-3,5-di-tert-butylphenyl)-2H-benzotriazole, 2-(2-hydroxy-5-tert-butylphenyl)-2H-benzotriazole, 2-(2-hydroxy-5-octylphenyl)-2H-benzotriazole, 2-(2-hydroxy-4-ethyloxyphenyl)-2H-benzotriazole, 2-(2-hydroxy-4-propyloxyphenyl)-2H-benzotriazole, 2-(2-hydroxy-4-octyloxyphenyl)-2H-benzotriazole, and 2-(2-hydroxy-4-octyloxyphenyl)-5-chloro-2H-benzotriazole.

Examples of the benzophenone-based compound include 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-n-dodecyloxybenzophenone, 2-hydroxy-4-benzyloxybenzophenone, and 2,2'-dihydroxy-4-methoxybenzophenone.

Examples of the dibenzoylmethane-based compound include 4-tert-butyl-4'-methoxydibenzoylmethane.

One kind or two or more kinds of these compounds may be used.

The addition amount of the ultraviolet absorber is preferably 0.01 parts by mass or more, more preferably 0.10 parts by mass or more, still more preferably 0.30 parts by mass or more, and yet still more preferably 0.40 parts by mass or more, and it is preferably 5 parts by mass or less, more preferably 3 parts by mass or less, and still more preferably 2 parts by mass or less, based on 100 parts by mass of the total amount of the polymerizable component.

<Polymerization Catalyst>

In the case where the polymerizable component contains the polyisocyanate component and the polythiol component, or the epithio compound, the polymerizable composition preferably contains a polymerization catalyst.

Examples of the polymerization catalyst include a tin compound and a nitrogen-containing compound.

Examples of the tin compound include an alkyl tin compound and an alkyl tin halide compound.

Examples of the alkyl tin compound include dibutyltin diacetate and dibutyltin dilaurate.

Examples of the alkyl tin halide compound include dibutyltin dichloride, dimethyltin dichloride, monomethyltin trichloride, trimethyltin chloride, tributyltin chloride, tributyltin fluoride, and dimethyltin dibromide.

Of these, dibutyltin diacetate, dibutyltin dilaurate, dibutyltin dichloride, and dimethyltin dichloride are preferred, and dimethyltin dichloride is more preferred.

Examples of the nitrogen-containing compound include a tertiary amine, a quaternary ammonium salt, an imidazole-based compound, and a pyrazole-based compound. The tertiary amine is preferably a hindered amine.

Examples of the tertiary amine include triethylamine, tri-n-propylamine, triisopropylamine, tri-n-butylamine, triisobutylamine, N,N-dimethylbenzylamine, N-methylmorpholine, N,N-dimethylcyclohexylamine, pentamethyldiethylenetriamine, bis(2-dimethylaminoethyl) ether, N-methylmorpholine, N,N'-dimethylpiperazine, N,N,N',N'-tetramethylethylenediamine, and 1,4-diazabicyclo[2.2.2]octane (DABCO).

Examples of the hindered amine include 1,2,2,6,6-pentamethyl-4-piperidinol, 1,2,2,6,6-pentamethyl-4-hydroxyethyl-4-piperidinol, methyl-1,2,2,6,6-pentamethyl-4-piperidyl sebacate, a mixture of methyl-1,2,2,6,6-pentamethyl-4-piperidyl sebacate and bis(1,2,2,6,6-pentamethyl-4-piperidyl) sebacate, bis(1,2,2,6,6-pentamethyl-4-piperidyl) sebacate, bis(2,2,6,6-tetramethyl-1-(octyloxy)-4-piperidyl) sebacate, bis(1,2,2,6,6-pentamethyl-4-piperidyl) [[3,5-bis(1,1-dimethylethyl)-4-hydroxyphenyl]methyl]butyl malonate, and tetrakis(1,2,2,6,6-pentamethyl-4-piperidyl)butane-1,2,3,4-tetracarboxylate.

Examples of the quaternary ammonium salt include tetraethylammonium hydroxide.

Examples of the imidazole-based compound include imidazole, 1,2-dimethylimidazole, benzylmethylimidazole, and 2-ethyl-4-imidazole.

Examples of the pyrazole-based compound include pyrazole and 3,5-dimethylpyrazole.

Of these, a tertiary amine, such as a hindered amine, an imidazole-based compound, and a pyrazole-based compound are preferred, and a hindered amine is more preferred.

The addition amount of the polymerization catalyst is preferably 0.001 parts by mass or more, more preferably 0.005 parts by mass or more, and still more preferably 0.007 parts by mass or more, and it is preferably 2 parts by mass or less, more preferably 1 part by mass or less, and still more preferably 0.5 parts by mass or less, based on 100 parts by mass of the total amount of the polymerizable component.

<Polymerization Initiator>

In the case where the polymerizable component contains the acrylic compound, the polymerizable composition preferably contains a radical polymerization initiator.

Examples of the radical polymerization initiator include an energy ray-sensitive polymerization initiator and a heat-sensitive polymerization initiator.

Examples of the energy ray-sensitive polymerization initiator include 2-hydroxy-2-methyl-1-phenylpropan-1-one, hydroxycyclohexyl phenyl ketone, methyl phenylglyoxylate, and 2,4,6-trimethylbenzoyl diphenyl phosphine oxide.

Examples of the heat-sensitive polymerization initiator include an organic peroxide and an azo compound.

Examples of the organic peroxide include peroxy esters, such as tert-butyl peroxyneodecanoate, tert-butyl peroxypivalate, tert-butyl peroxyisobutyrate, tert-butyl peroxyacetate, cumyl peroxyneodecanoate, tert-butyl peroxyoctoate, tert-butyl peroxyisopropylcarbonate, cumyl peroxyoctoate, tert-hexyl peroxyneodecanoate, tert-hexyl peroxypivalate, and tert-butyl peroxyneohexanoate; peroxy ketals, such as 1,1-bis(tert-butyl peroxy)-3,3,5-trimethylcyclohexane, 1,1-bis(tert-butyl peroxy)cyclohexane, 2,2-bis(tert-butyl peroxy)octane, and 2,2-bis(tert-butyl peroxy)butane; diacyl peroxides, such as acetyl peroxide, isobutyryl peroxide, octanoyl peroxide, lauroyl peroxide, benzoyl peroxide, and m-toluoyl peroxide; and peroxy dicarbonates, such as diisopropyl peroxy Bicarbonate and di-n-propyl peroxy Bicarbonate.

Examples of the azo compound include 2,2'-azobisisobutyronitrile, 1,1'-azobis(cyclohexane-1-carbonitrile), 2,2'-azobis(2-methylbutyronitrile), 2,2'-azobis(2,4-dimethylvaleronitrile), dimethyl-2,2'-azobisisobutyrate, and 2,2'-azobis(2,4,4-trimethylpentane).

The addition amount of the radical polymerization initiator is preferably 0.01 parts by mass or more, more preferably 0.1 parts by mass or more, and still more preferably 0.5 parts by mass or more, and it is preferably 10 parts by mass or less, more preferably 5 parts by mass or less, and still more preferably 3 parts by mass or less, based on 100 parts by mass of the total amount of the polymerizable component.

The polymerizable composition may contain other additive, for example, an antioxidant, a coloring inhibitor, and a fluorescent whitening agent. One kind or two or more kinds of these additives may be used.

The polymerizable composition is obtained by mixing the aforementioned respective components.

From the viewpoint of more suppressing occurrence of striae and white turbidity, the polymerizable composition may be further provided under a reduced pressure condition.

A pressure under the reduced pressure condition is preferably 10 Pa or more, more preferably 50 Pa or more, and still more preferably 100 Pa or more, and it is preferably 1,000 Pa or less, more preferably 800 Pa or less, and still more preferably 500 Pa or less.

[Production Method of Optical Member]

A production method of an optical member according to an embodiment of the present disclosure is hereunder described in more detail.

The production method of an optical member according to an embodiment of the present disclosure includes, for example, a step of injecting the aforementioned polymerizable composition into a molding die (hereinafter also referred to as "injection step"), and a step of polymerizing the polymerizable composition (hereinafter also referred to as "polymerization step").

<Injection Step>

In the injection step, for example, the obtained polymerizable composition is injected into a molding die.

In the case of producing a spectacle lens as the optical member, for example, a molding die including a pair of molds to form both main surfaces of the spectacle lens and a tape or a gasket for fixing these molds with a gap is used. It is to be noted that the aforementioned mold may be made of a glass or a metal.

In accordance with the aforementioned polymerizable composition, it is suited for production of a thick optical member in which striae are more liable to occur.

A maximum thickness within the molding die is preferably 5 to 30 mm, more preferably 5 to 25 mm, still more preferably 5 to 20 mm, yet still more preferably 6 to 20 mm, and even yet still more preferably 10 to 20 mm.

The maximum thickness within the molding die is preferably 5 mm or more, more preferably 6 mm or more, and still more preferably 10 mm or more, and it is preferably 30 mm or less, preferably 25 mm or less, and still more preferably 20 mm or less.

The "maximum thickness within the molding die" means a thickness of a thickest site within the molding die (mold). The "maximum thickness within the molding die" means, for example, a maximum distance between the pair of molds to form both main surfaces.

In accordance with the aforementioned polymerizable composition, even in the case of using a molding die having a maximum thickness within the molding die of 5 mm or more, in which striae are liable to occur, the occurrence of striae can be prevented.

Prior to injection into the molding die, the polymerizable composition may be filtered. Although a filtration method is not particularly limited, the filtration may be performed, for example, by using a filter having a pore diameter of 1 to 30 μm.

<Polymerization Step>

In the polymerization step, for example, the polymerizable composition is polymerized by heating.

The polymerization condition can be appropriately set depending on the polymerizable composition and the shape of an optical member to be molded.

A polymerization initiation temperature is typically 0 to 50° C., and preferably 5 to 30° C. The temperature is raised from the polymerization initiation temperature, and then heating is preferably performed to undergo curing formation. For example, a maximum temperature after temperature rise is typically 110 to 130° C.

A polymerization time from start to end of the polymerization is, for example, 1 to 96 hours, preferably 2 to 50 hours, more preferably 2 to 26 hours, still more preferably 2 to 14 hours, yet still more preferably 2 to 8 hours, and even yet still more preferably 2 to 5 hours.

The polymerization time from start to end of the polymerization is, for example, 96 hours or less, preferably 50 hours or less, more preferably 26 hours or less, still more preferably 14 hours or less, yet still more preferably 8 hours or less, and even yet still more preferably 5 hours or less, and it is, for example, 1 hour or more, and preferably 2 hours or more.

In accordance with the aforementioned polymerizable composition, even when the polymerization time is short as 8 hours or less at which striae are liable to occur, the occurrence of striae can be prevented.

After completion of the polymerization, the optical member may be removed from the die and subjected to an annealing treatment. A temperature of the annealing treatment is preferably 100 to 150° C.

By the aforementioned method, a resin for optical member is obtained.

[Optical Member]

Examples of the optical member include a spectacle lens, a camera lens, a prism, an optical fiber, a recording medium substrate to be used for an optical disc or a magnetic disk or the like, and an optical filter to be attached to a display of a computer. Of these, the spectacle lens is preferred.

The spectacle lens preferably includes a lens substrate composed of the foregoing optical member (hereinafter also referred to as "spectacle lens substrate").

A surface shape of the spectacle lens substrate is not particularly limited and may be any of a flat surface, a convex surface, and a concave surface.

The spectacle lens substrate may be any of a single focus lens, a multifocal lens, and a progressive power lens. For example, as one example, in the progressive power lens, typically, a near portion area (near portion) and a progressive area (intermediate area) are included in a lower area, and a distance portion area (distance portion) is included in an upper area.

The spectacle lens substrate may be either a finish type spectacle lens substrate or a semi-finish type spectacle lens substrate.

Although a thickness of the geometrical center and a diameter of the spectacle lens substrate are not particularly limited, the thickness of the geometric center is typically about 0.8 to 30 mm, and the diameter is typically about 50 to 100 mm.

A refractive index ($n_e$) of the spectacle lens substrate is, for example, 1.53 or more, 1.55 or more, 1.58 or more, or 1.60 or more, and it is, for example, 1.75 or less or 1.70 or less.

The spectacle lens preferably includes a spectacle lens substrate and a functional layer on the surface of the spectacle lens substrate.

Examples of the functional layer include at least one selected from the group consisting of a hard coat layer, a primer layer, an antireflection film, and a water-repellent film.

The hard coat layer is disposed for the purpose of improving scratch resistance, and preferably can be formed by applying a coating liquid containing a fine particulate inorganic material, such as an organic silicon compound, tin oxide, silicon oxide, zirconium oxide, and titanium oxide.

The primer layer is disposed for the purpose of improving impact resistance, and contains, for example, polyurethane as a main component. Here, the content of the polyurethane is preferably 50% by mass or more in the primer layer.

Examples of the antireflection film include a film obtained by laminating an inorganic material, such as silicon oxide, titanium dioxide, zirconium oxide, and tantalum oxide.

The water-repellent film can be formed using an organic silicon compound containing a fluorine atom.

[Spectacles]

The spectacles according to an embodiment of the present invention include a spectacle lens and a frame in which the spectacle lens is mounted.

The frame includes, for example, a pair of rims, a bridge disposed between the rims, and a pair of temples each disposed at one end of each of the rims.

The rims may be half rims.

The frame may be a so-called rimless frame. In this case, for example, the spectacles include a pair of spectacle lenses, a bridge disposed between the spectacle lenses, and a pair of temples each disposed at one end of each of the spectacle lenses.

EXAMPLES

With respect to the embodiments of the present disclosure, specific Examples are hereunder described, but it should be construed that the scope of claims of the present case is not limited by the following Examples. The operations and evaluations as mentioned below were performed in the air at room temperature (about 20 to 25° C.) unless otherwise specifically indicated. In addition, all "%" and "parts" as mentioned below are on a mass basis unless otherwise specifically indicated.

[Evaluation Methods]

<Striae>

A projective test was performed with a light source unit "OPTICAL MODULEX SX-UI251HQ" (manufactured by Ushio Inc.). Using a high-pressure UV lamp "USH-102D" (manufactured by Ushio Inc.) as a light source, a white screen was placed at a distance of 1 m, an optical member to be tested was inserted between the light source and the screen, and a projected image on the screen was observed and judged according to the following criteria.

The evaluation of striae was performed with respect to 100 sheets of optical members obtained, and a ratio of the number of optical members evaluated with a grade of "C" or higher according to the following criteria was determined.

A: Linear irregularities are not observed at all on the projected image.

B: Extremely thin linear irregularities are observed on the projected image.

C: Thin linear irregularities are observed on the projected image.

D: Thick linear irregularities are observed on the projected image (disqualified).

E: Remarkable linear irregularities are observed on the projected image (disqualified).

<White Turbidity>

An area within a diameter of 30 mm from the geometric center of the spectacle lens substrate was visually observed under fluorescent lighting in a dark box and judged according to the following criteria.

The evaluation of white turbidity was performed by selecting one sheet from 100 sheets of finish lenses obtained by a polymerization program for 24 hours, and a grade of "B" or higher according to the following criteria was recognized to be qualified.

A: No while turbidity is observed at all in the resin.

B: Thin while turbidity is observed in the resin.

C: Thick while turbidity is observed in the resin (disqualified).

[Urethaneurea Compound]

Urethaneurea Compound A-1 is the aforementioned Compound A-1.

Urethaneurea Compound A-2 is the aforementioned Compound A-2.

Urethaneurea Compound A-3 is the aforementioned Compound A-3.

Urethaneurea Compound A-4 is the aforementioned Compound A-4.

Example 1

52.4 parts by mass of 1,3-bis(isocyanatomethyl)cyclohexane, 0.10 parts by mass of a release agent "JP-50611" (butoxyethyl acid phosphate, manufactured by Johoku Chemical Co., Ltd.), 1.20 parts by mass of an ultraviolet absorber "Seesorb 701" (manufactured by Shipro Kasei Kaisha, Ltd.), 0.50 parts by mass of dimethyltin dichloride as a catalyst, and 1.00 part by mass of Urethaneurea Compound A-1 were mixed and dissolved to form a homogenous solution.

Furthermore, a mixture of 23.8 parts by mass of 2,5-bis(mercaptomethyl)-1,4-dithiane and 23.8 parts by mass of pentaerythritol tetrakis(2-mercaptoacetate) was added to the aforementioned solution, to form a homogenous solution, and a degasification treatment was performed at 200 Pa for one hour, to obtain a mixed solution.

This mixed solution was filtered with a PTFE (polytetrafluoroethylene) filter having a pore diameter of 5.0 μm.

Subsequently, the resulting mixed solution was injected into a molding die for semi-finish lens composed of an upper mold having a diameter of 75 mm and a curvature radius of 68 mm, a lower mold having a curvature radius of 55 mm, and a tape (central thickness: 14 mm, edge thickness: 19 mm) and a molding die for finish lens for −4.00D composed of an upper mold having a diameter of 75 mm and a curvature radius of 169 mm, a lower mold having a curvature radius of 79 mm, and a tape (central thickness: 1 mm, edge thickness: 6 mm).

The molding dies into which the mixed solution had been injected was placed in an electric furnace, and polymerization was performed by adopting each of polymerization programs shown in the following Table 1.

After completion of the polymerization, the molding dies were taken out from the electric furnace and removed from the molding dies, to obtain a semi-finish lens and a finish lens.

The obtained lenses were further annealed at 120° C. for 3 hours.

There were thus produced 100 sheets of semi-finish lenses and finish lenses, respectively in each of the polymerization programs. The various evaluations were performed, and the results are shown in Table 2.

Examples 2 to 10 and Comparative Examples 1 to 2

Lenses were obtained in the same manner as in Example 1, except for changing the kinds and amounts of the polyisocyanate component, the polythiol component, and the urethaneurea component as shown in Table 2. The various evaluations were performed, and the results are shown in Table 2.

TABLE 1

| | 4 hours Polymerization program (4 H) | | 12 hours Polymerization program (12 H) | | 24 hours Polymerization program (24 H) | | 48 hours Polymerization program (48 H) | |
|---|---|---|---|---|---|---|---|---|
| Time (H) | Temperature (° C.) | Time (H) | Temperature (° C.) | Time (H) | Temperature (° C.) | Time (H) | Temperature (° C.) |
| 0 | 15 | 0 | 15 | 0 | 15 | 0 | 15 |
| 0.75 | 15 | 4 | 15 | 9 | 15 | 18 | 15 |
| 1.5 | 60 | 8 | 60 | 18 | 60 | 36 | 60 |
| 2 | 120 | 10 | 120 | 22 | 120 | 46 | 120 |
| 4 | 120 | 12 | 120 | 24 | 120 | 48 | 120 |

TABLE 2

(1/3)

| Example/Comparative Example | | | Example 1 | Example 2 | Example 3 | Example 4 | Example 5 |
|---|---|---|---|---|---|---|---|
| Polymerizable composition | Polyisocyanate component | Kind | I-1 | I-2 | I-3 | I-1 | I-1 |
| | | Amount (parts by mass) | 52.4 | 50.3 | 50.6 | 52.4 | 52.4 |
| | Polythiol component 1 | Kind | T-1 | T-3 | T-4 | T-1 | T-1 |
| | | Amount (parts by mass) | 23.8 | 24.2 | 49.4 | 23.8 | 23.8 |
| | Polythiol component 2 | Kind | T-2 | T-2 | — | T-2 | T-2 |
| | | Amount (parts by mass) | 23.8 | 25.5 | — | 23.8 | 23.8 |
| | Urethaneurea compound | Kind | A-1 | A-1 | A-1 | A-1 | A-1 |
| | | Amount (parts by mass) | 1.00 | 1.00 | 1.00 | 0.20 | 4.50 |
| | Catalyst [dimethyltin dichloride] (parts by mass) | | 0.50 | 0.05 | 0.01 | 0.50 | 0.50 |

TABLE 2-continued (1/3 continued)

|  |  |  |  |  |  |  |  |  |  |  |  |
|---|---|---|---|---|---|---|---|---|---|---|---|
|  | Release agent [JP-506H] (parts by mass) |  | 0.10 |  | 0.10 |  | 0.10 |  | 0.10 |  | 0.10 |  |
|  | Ultraviolet absorber [Seesorb 701] (parts by mass) |  | 1.20 |  | 1.20 |  | 1.20 |  | 1.20 |  | 1.20 |  |
|  | Spectacle lens *1 |  | FIN | SEMI | FIN | SEMI | FIN | SEMI | FIN | SEMI | FIN | SEMI |
| Striae (number of sheets) | Polymerization program | 4 H | 100 | 98 | 100 | 91 | 100 | 93 | 100 | 95 | 100 | 98 |
|  |  | 12 H | 100 | 99 | 100 | 95 | 100 | 97 | 100 | 98 | 100 | 100 |
|  |  | 24 H | 100 | 100 | 100 | 100 | 100 | 100 | 100 | 100 | 100 | 100 |
|  |  | 48 H | 100 | 100 | 100 | 100 | 100 | 100 | 100 | 100 | 100 | 100 |
|  | White turbidity |  | A |  | A |  | A |  | A |  | B |  |

(2/3)

|  |  |  | Example 6 |  | Example 7 |  | Example 8 |  | Example 9 |  | Example 10 |  |
|---|---|---|---|---|---|---|---|---|---|---|---|---|
| Polymerizable composition | Polyisocyanate component | Kind | I-1 |  | I-1 |  | I-1 |  | I-1 |  | I-1 |  |
|  |  | Amount (parts by mass) | 52.4 |  | 52.4 |  | 52.4 |  | 52.4 |  | 52.4 |  |
|  | Polythiol component 1 | Kind | T-1 |  | T-1 |  | T-1 |  | T-1 |  | T-1 |  |
|  |  | Amount (parts by mass) | 23.8 |  | 23.8 |  | 23.8 |  | 23.8 |  | 23.8 |  |
|  | Polythiol component 2 | Kind | T-2 |  | T-2 |  | T-2 |  | T-2 |  | T-2 |  |
|  |  | Amount (parts by mass) | 23.8 |  | 23.8 |  | 23.8 |  | 23.8 |  | 23.8 |  |
|  | Urethaneurea compound | Kind | A-2 |  | A-3 |  | A-4 |  | A-1 |  | A-2 |  |
|  |  | Amount (parts by mass) | 1.50 |  | 1.00 |  | 2.00 |  | 8.00 |  | 6.00 |  |
|  | Catalyst [dimethyltin dichloride] (parts by mass) |  | 0.50 |  | 0.50 |  | 0.50 |  | 0.50 |  | 0.50 |  |
|  | Release agent [JP-506H] (parts by mass) |  | 0.10 |  | 0.10 |  | 0.10 |  | 0.10 |  | 0.10 |  |
|  | Ultraviolet absorber [Seesorb 701] (parts by mass) |  | 1.20 |  | 1.20 |  | 1.20 |  | 1.20 |  | 1.20 |  |
|  | Spectacle lens *1 |  | FIN | SEMI | FIN | SEMI | FIN | SEMI | FIN | SEMI | FIN | SEMI |
| Striae (number of sheets) | Polymerization program | 4 H | 100 | 89 | 100 | 90 | 100 | 88 | 100 | 99 | 100 | 96 |
|  |  | 12 H | 100 | 92 | 100 | 94 | 100 | 92 | 100 | 100 | 100 | 98 |
|  |  | 24 H | 100 | 98 | 100 | 99 | 100 | 97 | 100 | 100 | 100 | 100 |
|  |  | 48 H | 100 | 100 | 100 | 100 | 100 | 100 | 100 | 100 | 100 | 100 |
|  | White turbidity |  | B |  | A |  | A |  | C |  | C |  |

(3/3)

|  |  |  | Comparative Example 1 |  | Comparative Example 2 |  |
|---|---|---|---|---|---|---|
| Polymerizable composition | Polyisocyanate component | Kind | I-1 |  | I-1 |  |
|  |  | Amount (parts by mass) | 52.4 |  | 52.4 |  |
|  | Polythiol component 1 | Kind | T-1 |  | T-1 |  |
|  |  | Amount (parts by mass) | 23.8 |  | 23.8 |  |
|  | Polythiol component 2 | Kind | T-2 |  | T-2 |  |
|  |  | Amount (parts by mass) | 23.8 |  | 23.8 |  |
|  | Urethaneurea compound | Kind | — |  | A-1 |  |
|  |  | Amount (parts by mass) | — |  | 0.05 |  |
|  | Catalyst [dimethyltindichloride] (parts by mass) |  | 0.50 |  | 0.50 |  |
|  | Release agent [JP-506H] (parts by mass) |  | 0.10 |  | 0.10 |  |
|  | Ultraviolet absorber [Seesorb 701] (parts by mass) |  | 1.20 |  | 1.20 |  |
|  | Spectacle lens *1 |  | FIN | SEMI | FIN | SEMI |
| Striae (number of sheets) | Polymerization program | 4 H | 0 | 0 | 0 | 0 |
|  |  | 12 H | 0 | 0 | 0 | 0 |
|  |  | 24 H | 99 | 56 | 100 | 55 |
|  |  | 48 H | 100 | 92 | 100 | 93 |
|  | White turbidity |  | A |  | A |  |

*1 FIN: Finish lens (central thickness: 1 mm, edge thickness 6 mm); SEMI: Semi-finish lens (central thickness: 14 mm, edge thickness 19 mm)

1-1: 1,3-Bis(isocyanatomethyl)cyclohexane
1-2: Mixture of 2,5-bis(isocyanatomethyl)-bicyclo[2.2.1]heptane and 2,6-bis(isocyanatomethyl)-bicyclo[2.2.1]heptane
1-3: 1,3-Bis(isocyanatomethyl)benzene
T-1: 2,5-Bis(mercaptomethyl)-1,4-dithiane
T-2: Pentaerythritol tetrakis(2-mercaptoacetate)
T-3: 4-Mercaptomethyl-1,8-dimercapto-3,6-dithiaoctane
T-4: Mixture of 4,7-bis(mercaptomethyl)-3,6,9-trithiaundecane-1,11-dithiol, 4,8-bis(mercaptomethyl)-3,6,9-trithiaundecane-1,11-dithiol, and 5,7-bis(mercaptomethyl)-3,6,9-trithiaundecane-1,11-dithiol Example 11

95.0 parts by mass of bis(β-epithiopropyl)sulfide, 5.0 parts by mass of bis(2-mercaptoethyl)sulfide, 1.80 parts by mass of an ultraviolet absorber "Seesorb 701" (manufactured by Shipro Kasei Kaisha, Ltd.), 0.10 parts by mass of tetrabutyl phosphonium bromide as a catalyst, and 1.00 part by mass of Compound A-2 were mixed and dissolved to form a homogenous solution.

This mixed solution was filtered with a PTFE (polytetrafluoroethylene) filter having a pore diameter of 5.0 μm.

Subsequently, the resulting mixed solution was injected into a molding die for semi-finish lens composed of an upper mold having a diameter of 75 mm and a curvature radius of 68 mm, a lower mold having a curvature radius of 55 mm, and a tape (central thickness: 14 mm, edge thickness: 19 mm) and a molding die for finish lens for –4.00D composed of an upper mold having a diameter of 75 mm and a curvature radius of 169 mm, a lower mold having a curvature radius of 79 mm, and a tape (central thickness: 1 mm, edge thickness: 6 mm).

The molding dies into which the mixed solution had been injected was placed in an electric furnace, and polymerization was performed by adopting each of polymerization programs as mentioned below.

After completion of the polymerization, the molding dies were taken out from the electric furnace and removed from the molding dies, to obtain a semi-finish lens and a finish lens.

The obtained lenses were further annealed at 120° C. for 2 hours.

There were thus produced 100 sheets of semi-finish lenses and finish lenses, respectively in each of the polymerization programs. The various evaluations were performed, and the results are shown in Table 4.

Comparative Example 3

Lenses were fabricated in the same manner as in Example 11, except for not adding the Compound A-2. The various evaluations were performed, and the results are shown in Table 4.

TABLE 3

| 8 hours Polymerization program (8 H) | | 12 hours Polymerization program (12 H) | | 24 hours Polymerization program (24 H) | | 48 hours Polymerization program (48 H) | |
|---|---|---|---|---|---|---|---|
| Time (H) | Temperature (° C.) | Time (H) | Temperature (° C.) | Time (H) | Temperature (° C.) | Time (H) | Temperature (° C.) |
| 0 | 30 | 0 | 30 | 0 | 30 | 0 | 30 |
| 2 | 30 | 4 | 30 | 9 | 30 | 18 | 30 |
| 4.5 | 60 | 8 | 60 | 18 | 60 | 36 | 60 |
| 6 | 100 | 10 | 100 | 22 | 100 | 46 | 100 |
| 8 | 100 | 12 | 100 | 24 | 100 | 48 | 100 |

TABLE 4

| | Example/Comparative Example | | Example 11 | | Comparative Example 3 | |
|---|---|---|---|---|---|---|
| Polymerizable composition | Bis(β-epithiopropyl)sulfide (parts by mass) | | 95.0 | | 95.0 | |
| | Bis(2-mercaptoethyl)sulfide (parts by mass) | | 5.0 | | 5.0 | |
| | Compound A-2 (parts by mass) | | 1.00 | | — | |
| | Catalyst [tetrabutyl phosphonium bromide] (parts by mass) | | 0.10 | | 0.10 | |
| | Ultraviolet absorber [Seesorb 701] (parts by mass) | | 1.80 | | 1.80 | |
| | Spectacle lens *1 | | FIN | SEMI | FIN | SEMI |
| Striae (number of sheets) | Polymerization program | 8 H | 98 | 88 | 0 | 0 |
| | | 12 H | 100 | 95 | 0 | 0 |
| | | 24 H | 100 | 100 | 94 | 67 |
| | | 48 H | 100 | 100 | 100 | 88 |
| | White turbidity | | A | | A | |

*1 FIN: Finish lens (central thickness: 1 mm, edge thickness 6 mm); SEMI: Semi-finish lens (central thickness: 14 mm, edge thickness 19 mm)

Example 12

60.0 parts by mass of 2,2-bis[4-[2-(methacryloyloxy)ethoxy]phenyl]propane (compound represented by the following structural formula:

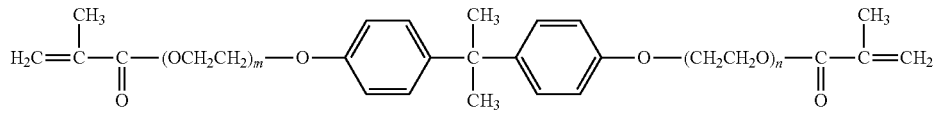

(wherein m and n are each an average addition molar number, and (m+n) is 2.6)), 40.0 parts by mass of tetraethylene glycol dimethacrylate, 1.00 part by mass of tert-butyl peroxyneodecanoate as a polymerization initiator, and 1.00 part by mass of Compound A-1 were mixed and dissolved to form a homogenous solution.

This mixed solution was filtered with a PTFE (polytetrafluoroethylene) filter having a pore diameter of 5.0 μm.

Subsequently, the resulting mixed solution was injected into a molding die for semi-finish lens composed of an upper mold having a diameter of 75 mm and a curvature radius of 68 mm, a lower mold having a curvature radius of 55 mm, and a tape (central thickness: 14 mm, edge thickness: 19 mm) and a molding die for finish lens for −4.00D composed of an upper mold having a diameter of 75 mm and a curvature radius of 169 mm, a lower mold having a curvature radius of 79 mm, and a tape (central thickness: 1 mm, edge thickness: 6 mm).

The molding dies into which the mixed solution had been injected was placed in an electric furnace, and polymerization was performed by adopting each of polymerization programs as mentioned below.

After completion of the polymerization, the molding dies were taken out from the electric furnace and removed from the molding dies, to obtain a semi-finish lens and a finish lens.

The obtained lenses were further annealed at 120° C. for 2 hours.

There were thus produced 100 sheets of semi-finish lenses and finish lenses, respectively in each of the polymerization programs. The various evaluations were performed, and the results are shown in Table 6.

Comparative Example 4

Lenses were fabricated in the same manner as in Example 12, except for not adding the Compound A-1. The various evaluations were performed, and the results are shown in Table 6.

TABLE 5

| 8 hours Polymerization program (8 H) | | 12 hours Polymerization program (12 H) | | 24 hours Polymerization program (24 H) | | 48 hours Polymerization program (48 H) | |
|---|---|---|---|---|---|---|---|
| Time (H) | Temperature (° C.) | Time (H) | Temperature (° C.) | Time (H) | Temperature (° C.) | Time (H) | Temperature (° C.) |
| 0 | 30 | 0 | 30 | 0 | 30 | 0 | 30 |
| 2 | 30 | 4 | 30 | 9 | 30 | 18 | 30 |
| 4.5 | 60 | 8 | 60 | 18 | 60 | 36 | 60 |
| 6 | 100 | 10 | 100 | 22 | 100 | 46 | 100 |
| 8 | 100 | 12 | 100 | 24 | 100 | 48 | 100 |

TABLE 6

| Example/Comparative Example | | | Example 12 | | Comparative Example 4 | |
|---|---|---|---|---|---|---|
| Polymerizable composition | 2,2-Bis[4-[2-(methacryloyloxy)ethoxy]phenyl]propane (parts by mass) | | 60.0 | | 60.0 | |
| | Tetraethylene glycol dimethacrylate (parts by mass) | | 40.0 | | 40.0 | |
| | Compound A-1 (parts by mass) | | 1.00 | | — | |
| | Polymerization initiator [tert-butyl peroxyneodecanoate] (parts by mass) | | 1.00 | | 1.00 | |
| | Spectacle lens *1 | | FIN | SEMI | FIN | SEMI |
| Striae (number of sheets) | Polymerization program | 8 H | 99 | 90 | 0 | 0 |
| | | 12 H | 100 | 96 | 0 | 0 |
| | | 24 H | 100 | 100 | 98 | 40 |
| | | 48 H | 100 | 100 | 100 | 86 |
| | White turbidity | | A | | A | |

*1 FIN: Finish lens (central thickness: 1 mm, edge thickness 6 mm); SEMI: Semi-finish lens (central thickness: 14 mm, edge thickness 19 mm)

In the light of the above, in accordance with the polymerizable compositions of the Examples, the occurrence of striae is suppressed.

The invention claimed is:

1. A polymerizable composition for optical member comprising
a polymerizable component; and
a urethaneurea compound having a structural unit derived from tolylene diisocyanate in an amount of 0.1 to 10 parts by mass based on 100 parts by mass of a total amount of the polymerizable component,
wherein the polymerizable component contains at least one selected from the group consisting of a polyisocyanate component and a polythiol component, and an epithio compound.

2. The polymerizable composition for optical member according to claim 1, wherein the urethaneurea compound is a compound represented by the formula (1):

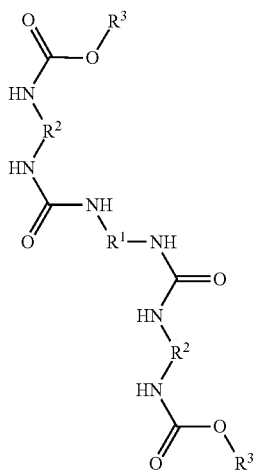

(1)

wherein,
$R^1$ is a group represented by any one of the formulae (R1-1), (R1-2), (R1-3), (R1-4), and (R1-5):

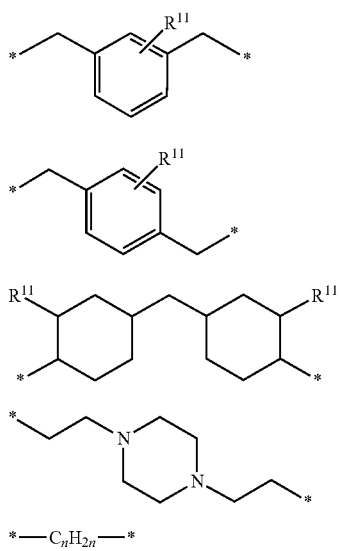

(R1-1)
(R1-2)
(R1-3)
(R1-4)
(R1-5)

wherein,
$R^{11}$'s are each independently a hydrogen atom or a hydrocarbon group having 1 to 3 carbon atoms; n is an integer of 1 to 6; and * is a bonding site;
$R^2$'s are each independently a group represented by the formula (R2-1) or (R2-2):

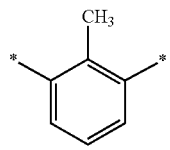

(R2-1)

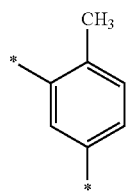

(R2-2)

wherein,
* is a bonding site; and
$R^3$'s are each independently a group represented by the formula (R3-1) or (R3-2):

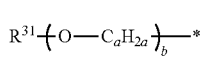

(R3-1)

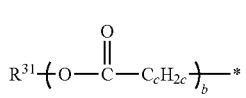

(R3-2)

wherein,
$R^{31}$ is a linear or branched aliphatic hydrocarbon group having 2 to 22 carbon atoms, a cyclic aliphatic hydrocarbon group having 6 to 12 carbon atoms, or an aralkyl group having 7 to 12 carbon atoms;
a is 2 to 4; b is 0 to 15; and c is 4 or 5.

3. The polymerizable composition for optical member according to claim 2, wherein $R^3$ of the compound represented by the formula (1) is a linear aliphatic hydrocarbon group having 4 to 8 carbon atoms.

4. The polymerizable composition for optical member according to claim 2, wherein $R^1$ of the compound represented by the formula (1) is the formula (R1-1) or the formula (R1-2).

5. The polymerizable composition for optical member according to claim 1, wherein the content of the urethaneurea compound is 0.1 to 5.0 parts by mass based on 100 parts by mass of a total amount of the polymerizable component.

6. The polymerizable composition for optical member according to claim 1, wherein the polymerizable component contains a polyisocyanate component and a polythiol component.

7. The polymerizable composition for optical member according to claim 6, wherein the polyisocyanate component contains at least one polyisocyanate compound selected from the group consisting of 2,5-bis(isocyanatomethyl)-bicyclo[2.2.1]heptane, 2,6-bis(isocyanatomethyl)-bicyclo[2.2.1]heptane, 1,3-bis(isocyanatomethyl)cyclohexane, 1,4-bis(isocyanatomethyl)cyclohexane, 1,3-bis(isocyanatomethyl)benzene, 1,4-bis(isocyanatomethyl)benzene, dicyclohexylmethane-4,4'-diisocyanate, isophorone diisocyanate, and hexamethylene diisocyanate.

8. The polymerizable composition for optical member according to claim 6, wherein the polythiol component contains at least one polythiol compound selected from the group consisting of 2,5-bis(mercaptomethyl)-1,4-dithiane, pentaerythritol tetrakis(2-mercaptoacetate), pentaerythritol tetrakis(3-mercaptopropionate), 4-mercaptomethyl-1,8-dimercapto-3,6-dithiaoctane, 4,7-bis(mercaptomethyl)-3,6,9-trithiaundecane-1,11-dithiol, 4,8-bis(mercaptomethyl)-3,6,9-trithiaundecane-1,11-dithiol, 5,7-bis(mercaptomethyl)-3,6,9-trithiaundecane-1,11-dithiol, trimethylolpropane tris(2-mercaptoacetate), trimethylolpropane tris(3-mercaptopropionate), butanediol bis(2-mercaptoacetate), butanediol bis(3-mercaptopropionate), dipentaerythritol hexakis(2-mercaptoacetate), and dipentaerythritol hexakis (3-mercaptopropionate).

9. The polymerizable composition for optical member according to claim 6, wherein an equivalent ratio of the mercapto group of the polythiol component to the isocyanate group of the polyisocyanate component [(mercapto group)/(isocyanate group)] is 40/60 or more and 60/40 or less.

10. The polymerizable composition for optical member according to claim 1, wherein the polymerizable component contains an episulfide compound having an aliphatic skeleton as the epithio compound.

11. A production method of an optical member, comprising
a step of injecting the polymerizable composition according to claim 1 into a molding die, and
a step of polymerizing the polymerizable composition.

12. The production method of an optical member according to claim 11, wherein a maximum thickness within the molding die is 5 to 20 mm.

13. The production method of an optical member according to claim 11, comprising a step in which in the polymerization step, the polymerization is started at 0 to 50° C., and the temperature is further raised to continue the polymerization.

14. The production method of an optical member according to claim 11, wherein in the polymerization step, a polymerization time is 2 to 8 hours.

15. The production method of an optical member according to claim 11, comprising a step in which after completion of the polymerization step, annealing is performed at 100 to 150° C.

16. The production method of an optical member according to claim 11, wherein the optical member is a spectacle lens substrate.

17. A spectacle lens comprising a spectacle lens substrate obtained by the production method according to claim 16.

* * * * *